(12) United States Patent
Park et al.

(10) Patent No.: US 11,061,915 B2
(45) Date of Patent: Jul. 13, 2021

(54) SYSTEM AND METHOD FOR ANOMALY CHARACTERIZATION BASED ON JOINT HISTORICAL AND TIME-SERIES ANALYSIS

(71) Applicants: Palo Alto Research Center Incorporated, Palo Alto, CA (US); Panasonic Corporation, Kadoma (JP)

(72) Inventors: Jungho Park, Gwangmyeong-si (KR); Ajay Raghavan, Mountain View, CA (US); Ryan A. Rossi, Mountain View, CA (US); Yosuke Tajika, Hyogo (JP); Akira Minegishi, Osaka (JP); Tetsuyoshi Ogura, Osaka (JP)

(73) Assignees: Palo Alto Research Center Incorporated, Palo Alto, CA (US); Panasonic Corporation, Kadoma (JP)

( * ) Notice: Subject to any disclaimer, the term of this patent is extended or adjusted under 35 U.S.C. 154(b) by 334 days.

(21) Appl. No.: 16/170,815

(22) Filed: Oct. 25, 2018

(65) Prior Publication Data
US 2020/0134075 A1 Apr. 30, 2020

(51) Int. Cl.
*G06F 16/2458* (2019.01)
*G06F 16/28* (2019.01)
*G01D 9/00* (2006.01)

(52) U.S. Cl.
CPC ......... *G06F 16/2465* (2019.01); *G01D 9/00* (2013.01); *G06F 16/285* (2019.01); *G06F 2216/03* (2013.01)

(58) Field of Classification Search
None
See application file for complete search history.

(56) References Cited

U.S. PATENT DOCUMENTS

| 8,000,910 B2 * | 8/2011 | Bickel | H02J 3/00 |
| | | | 702/58 |
| 2003/0009399 A1 * | 1/2003 | Boerner | G06F 17/18 |
| | | | 705/35 |

(Continued)

FOREIGN PATENT DOCUMENTS

EP 3376446 A1 9/2018

OTHER PUBLICATIONS

Xie et al., Anomaly Detection and Redundancy Elimination of Big Sensor Data in Internet of Things, School of Computer Science and Engineering, Northeastern University, China, 2017, pp. 1-22 (Year: 2017).*

*Primary Examiner* — Roy Y Yi
(74) *Attorney, Agent, or Firm* — Shun Yao; Park, Vaughan, Fleming & Dowler LLP.

(57) ABSTRACT

One embodiment provides a system for facilitating anomaly detection and characterization. During operation, the system determines, by a computing device, a first set of testing data which includes a plurality of data points, wherein the first set includes a data series for a first variable and one or more second variables. The system identifies anomalies by dividing the first set into a number of groups and performing an inter-quartile range analysis on data in each respective group. The system obtains, from the first set, a second set of testing data which includes a data series from a recent time period occurring before a current time, and which further includes a first data point from the identified anomalies. The system classifies the first data point as a first type of anomaly based on whether a magnitude of a derivative of the second set is greater than a first predetermined threshold.

20 Claims, 12 Drawing Sheets
(6 of 12 Drawing Sheet(s) Filed in Color)

(56) References Cited

U.S. PATENT DOCUMENTS

| | | | |
|---|---|---|---|
| 2004/0230387 A1* | 11/2004 | Bechhoefer | G01R 31/11 |
| | | | 702/58 |
| 2014/0006325 A1 | 1/2014 | Biem | |
| 2014/0269339 A1 | 9/2014 | Jaafar et al. | |
| 2015/0269050 A1* | 9/2015 | Filimonov | G06Q 10/0639 |
| | | | 702/183 |
| 2015/0341246 A1 | 11/2015 | Boubez | |

* cited by examiner

SYSTEM AND METHOD FOR ANOMALY CHARACTERIZATION BASED ON JOINT HISTORICAL AND TIME-SERIES ANALYSIS

RELATED APPLICATION

The subject matter of this application is related to the subject matter in the following applications:
U.S. patent application Ser. No. 16/143,223, entitled "SYSTEM AND METHOD FOR BINNED INTER-QUARTILE RANGE ANALYSIS IN ANOMALY DETECTION OF TIME-SERIES DATA," by inventors Ajay Raghavan, Ryan Rossi, and Jungho Park, filed 26 Sep. 2018 (hereinafter "U.S. patent application Ser. No. 16/143,223"),
the disclosure of which is herein incorporated by reference in its entirety.

BACKGROUND

Field

This disclosure is generally related to detecting anomalies. More specifically, this disclosure is related to a system and method for anomaly characterization based on joint historical and time-series analysis.

Related Art

Anomaly detection, or outlier detection, is a data mining method which identifies items or events that do not conform to an expected pattern or others in a data set. Anomaly detection is relevant in various fields, e.g., manufacturing, medical areas, and energy-related fields. For example, in manufacturing, energy usage can incur a significant cost, such as in running a factory with machines or a data center with devices. To this end, identifying anomalies may provide a more efficient manufacturing system, which can in turn reduce costs and improve the overall efficiency of the system as well as its constituent components or parts.

With the advent of smart meters, sensors, and Internet-of-Things (IoT) devices, an opportunity exists to monitor inefficiencies in factory machines and to detect and manage unusual energy usage. Related application Ser. No. 16/143,223 is directed to a method which facilitates anomaly detection by using historical ranges and a binned inter-quartile range analysis on time-series data for a two-dimensional or higher dimensional data set. However, there is currently no way to distinguish between, on the one hand, genuine opportunities for reducing energy or productivity losses, and, on the other hand, uncontrollable power surges from rapid transient events (e.g., a power on/off, sudden temperature changes, and sudden production level increases). This can result in an inefficient system for data mining and anomaly detection.

SUMMARY

One embodiment provides a system for facilitating anomaly detection and characterization. During operation, the system determines, by a computing device, a first set of testing data which includes a plurality of data points, wherein the first set includes a data series for a first variable and one or more second variables, and wherein the one or more second variables are dependent on the first variable. The system identifies anomalies by dividing the first set of testing data into a number of groups and performing an inter-quartile range analysis on data in each respective group. The system obtains, from the first set of testing data, a second set of testing data which includes a data series from a recent time period occurring less than a predetermined period of time before a current time, and which further includes a first data point from the identified anomalies. The system classifies the first data point as a first type of anomaly based on whether a magnitude of a derivative of the second set of testing data is greater than a first predetermined threshold, thereby enhancing data mining and outlier detection for the data series based on a historical analysis of the first set of testing data and a recent time-series analysis of the second set of testing data.

In some embodiments, the first variable or the one or more second variables is one or more of: a parameter associated with a physical device involved in obtaining the first set of testing data. The parameter is one or more of: a temperature value; a count, quantity, or other unit to measure production; a unit or measurement of flow for a material; a unit or measurement of pressure for a material; and any parameter which can be used as a control parameter in measuring another parameter.

In some embodiments, the physical device is one or more of a sensor, a smart meter, an Internet of Things (IoT) device, and any device which can measure the parameter.

In some embodiments, the system classifies the first data point as the first type of anomaly in response to determining that the magnitude of the derivative of the second set of testing data is greater than the first predetermined threshold. The system classifies the first data point as a second type of anomaly in response to determining that the magnitude of the derivative of the second set of testing data is not greater than the first predetermined threshold.

In some embodiments, the first type of anomaly is associated with one or more of: a surge in a control parameter; an on/off event; and a sudden transient change in the control parameter. The second type of anomaly is associated with a steady-state anomaly.

In some embodiments, the system detects a trend which indicates high surges associated with a physical device involved in obtaining the first set of testing data, by determining a third set of data points which are classified as anomalies and are attributable to the surge in the control parameter, the on/off event, or the sudden transient change in the control parameter.

In some embodiments, in response to determining that the trend is not greater than a second predetermined threshold, the system determines that the physical device is experiencing normal operation. In response to determining that the trend is greater than the second predetermined threshold, the system determines that the physical device is experiencing degradation.

In some embodiments, the system classifies, by a user of the computing device, the first data point as the first type of anomaly based on a set of predetermined conditions. The system performs, by the user of the computing device, an action to address the classified anomaly. The action includes one or more of: a remedial or corrective action to ensure that the classified anomaly no longer occurs; adjusting a physical parameter which affects the first variable or the one or more second variables; and adjusting a physical component of a device from which the data series is obtained.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
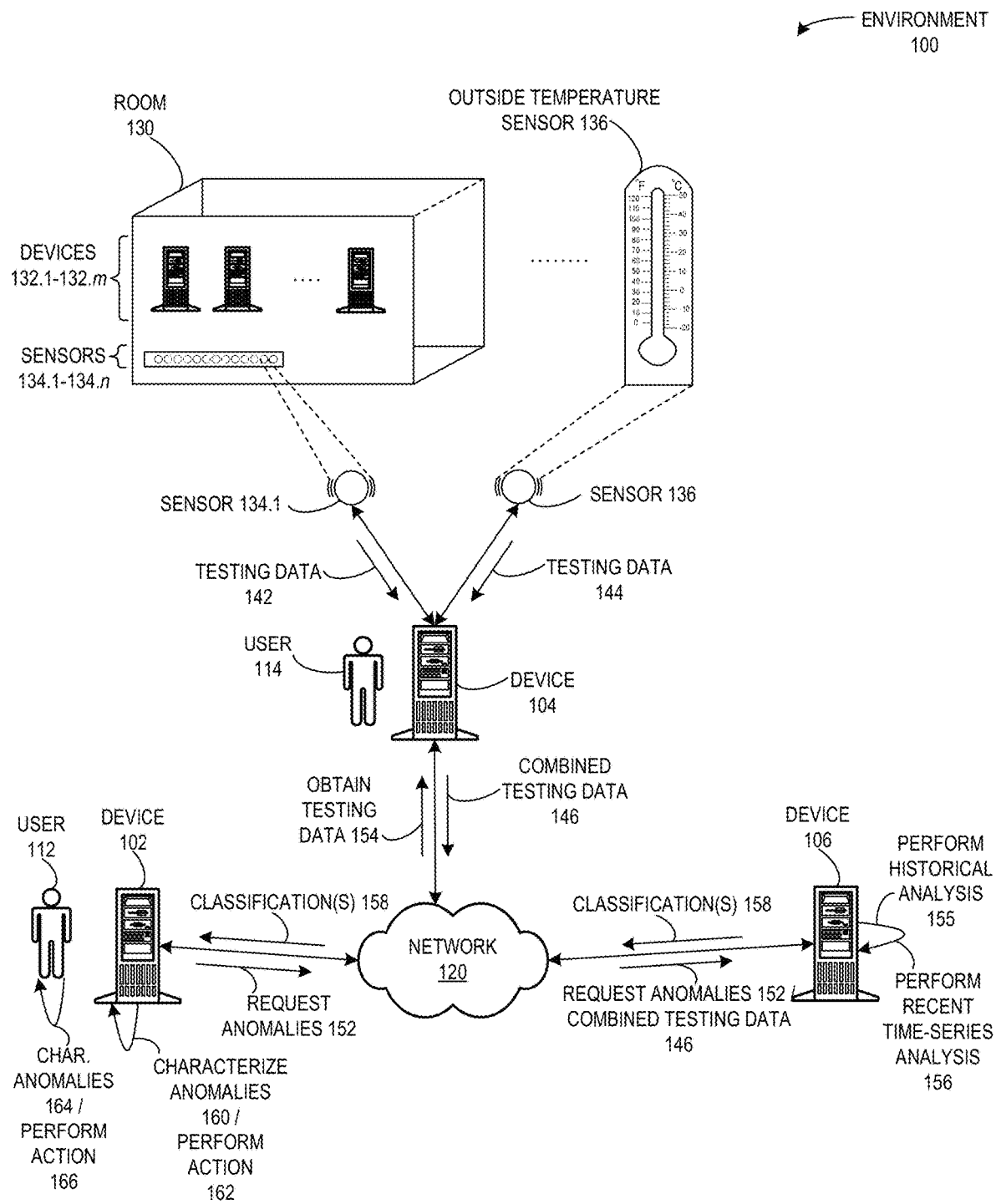
FIG. 1 illustrates an exemplary environment for facilitating anomaly detection and characterization, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of identifying and characterizing anomalies in a two-dimensional or higher dimensional data set by providing a system which analyzes both historical data and recent time-series data.

Energy usage can incur a significant overall system cost, such as in running a factory with machines or a data center with many machines. With the advent of smart meters, sensors, and Internet-of-Things (IoT) devices, an opportunity exists to monitor inefficiencies in factory machines and to detect and manage unusual energy usage. Related application Ser. No. 16/143,223 is directed to a method which facilitates anomaly detection by using historical ranges and a binned inter-quartile range analysis on time-series data for a two-dimensional or higher dimensional data set. However, there is currently no way to distinguish between, on the one hand, genuine opportunities for reducing energy or productivity losses, and, on the other hand, uncontrollable power surges from rapid transient events (e.g., a power on/off, sudden temperature changes, and sudden production level increases). This can result in an inefficient system for data mining and anomaly detection.

The embodiments described herein solve this problem by identifying and characterizing anomalies in a two-dimensional or higher dimensional data set, by using historical data/patterns (e.g., obtained from a set of sensors) as well as correlating present energy usage relative to the historical data/patterns (e.g., recent time-series data analysis). For example, the system can combine learned thresholds for various parameter surges in recent time history with the expected energy consumption levels for a given control/response variable associated with a specific machine.

As discussed above, identifying and characterizing anomalies may provide a more efficient system in many areas (e.g., manufacturing, medical fields, and energy-related fields), and can in turn reduce costs and improve the overall efficiency of the system as well as its constituent components or parts. The embodiments described herein provide a computer system which improves the efficiency of detecting and characterizing anomalies in a data series over two or more dimensions or variables by performing a historical analysis (e.g., using the "binned" IQR analysis described in U.S. patent Ser. No. 16/143,223) and by subsequently performing a recent time-series analysis for any identified anomalies.

Furthermore, in the embodiments described herein, the system enhances and improves data mining and outlier detection, where the improvements are fundamentally technological. The improvements can result in a more efficient manufacturing system or other physical system by more effectively identifying and characterizing anomalies. A system administrator or other user can take a remedial or other action based on the identified anomalies to improve the overall efficiency of the manufacturing or other physical system.

Thus, the embodiments described herein provide a technological solution (performing a joint historical and time-series analysis of data over two or more dimensions in order to detect and characterize anomalies) to a technological problem (improving the efficiency of a manufacturing or other physical system by allowing a user to take an action based on the detected and characterized anomalies). For example, the user (or system) may perform an action to remove or address the anomalies, or may perform an action which treats some characterized anomalies as more or less important than other characterized anomalies, e.g., by assigning a weight or priority to certain characterized anomalies.

Exemplary Environment and Communication

FIG. 1 illustrates an exemplary environment 100 for facilitating anomaly detection and characterization, in accordance with an embodiment of the present invention. Environment 100 can include: a device 102 and an associated user 112; a device 104 and an associated user 114; and a device 106. Devices 102, 104, and 106 can communicate with each other via a network 120. Environment 100 can also include a physical object (or objects) with sensors which can record data over a period of time and at periodic intervals. For example, environment 100 can include: a room 130 which can include devices 132.1-132.$m$ and sensors 134.1-134.$n$; and an outside temperature sensor 136. Sensors 134.1-134.$n$ can monitor a physical feature associated with the room, such as an amount of heating, ventilation, and air conditioning (HVAC) energy consumed in room 130 or the amount of HVAC energy consumed or used by a specific device in room 130. Outside temperature sensor 136 can monitor the temperature of the air outside the room, whether inside a same building or outside of the building in which room 130 resides.

As another example, sensor 134.1 can measure an amount of HVAC energy consumed (e.g., in Kilowatt hours or kWh) by a specific device 132.1 (e.g., a compressor machine), while sensor 134.2 can measure an amount of flow (e.g., in $m^3$) of a material being produced by or traveling through the specific device 132.1. As yet another example, sensor 134.3 can measure the HVAC energy consumed (e.g., in kWh) consumed or used by a specific device 132.2 (e.g., a potting machine), while sensor 134.4 can measure a number of units produced (e.g., in units).

During operation, the sensors can send their respective measured testing data to device 104. For example, device 104 can obtain testing data 142 from sensor 134.1, and can also obtain testing data 144 from sensor 136. At the same or a different time, user 112 can send a command to request anomalies 152 for certain testing data related to sensors 134.1-134.$n$ of room 130 and outside temperature sensor 136, which can result in sending an obtain testing data 154 command to device 104.

Device 104 can obtain testing data 142 and 144, and can combine testing data 142 and 144. Device 104 can send combined testing data 146 to device 106 via network 120. Note that testing data 142, testing data 144, and combined testing data 146 can be a data series, which can include time-series data or can cover a frequency spectra. Upon receiving the request anomalies 152 command along with combined testing data 146, device 106 can perform a historical analysis (function 155), which identifies anomalies by dividing combined testing data 146 into a number of bins and performing an IQR analysis on the data in each bin (function 155). Performing a "binned" inter-quartile range (IQR) analysis is described in U.S. patent Ser. No. 16/143, 223. During the IQR analysis, device 106 can identify testing data points from combined testing data 146 (and specifically, from the testing data points in each divided bin or group of testing data) which are not within a range defined by a lower bound and an upper bound for a respective bin, where the lower and upper bound are determined based on the IQR analysis.

After identifying the anomalies based on the IQR analysis, device 106 can perform a recent time-series analysis (function 156), by obtaining from combined testing data 146 a second set of testing data which includes a data series from a recent time period. The recent time period can occur less than a predetermined period of time before the current time, and the second set of testing data can include a first data point from the anomalies identified based on the IQR analysis.

As part of function 156, device 106 can calculate a magnitude of a derivative of the second set of testing data, and classify the first data point as a certain type of anomaly based on whether the magnitude of the derivative of the second set of testing data is greater than a first predetermined threshold. The magnitude of the derivative and the first predetermined threshold can be a positive number, a negative number, or zero. Device 106 can send a (the) classification(s) 158 of the first data point (and other classified data points) in the second set of testing data back to device 102 via network 120.

Upon receiving classification(s) 158, device 102 can characterize the anomalies (function 160), and can also perform an action (function 162), which can include executing a predetermined rule based on the classification (as an anomaly) or the characterization (as a certain type of anomaly). For example, if the magnitude of the derivative of the second set of testing data is greater than the first predetermined threshold, device 102 can characterize the first data point as a surge anomaly, which can be related to a power on/off event, a surge in a control parameter (such as the power or a component which measures pressure), or a sudden transient change in a control parameter. Other types of anomalies may be associated with a steady-state anomaly (e.g., if the magnitude of the derivative of the second set of testing data is less than the first predetermined threshold). Furthermore, the predetermined rule can include automatically adjusting a physical component or unit related to the sensors or devices involved in obtaining the testing data.

Similarly, user 112 can characterize the anomalies (function 164), and can also perform an action (function 166), which can include reviewing the classified anomaly in light of other historical data (e.g., learned thresholds for surges in the recent time history and the expected energy consumption levels for a given control or response variable relevant to a given machine). Action 166 can result in user 112 remediating or discovering a reason for the classified anomaly, at which point user 112 can take measures to prevent such anomalies from occurring again.

That is, classification(s) 158 allows both device 102 and user 112 to use the results of: 1) the enhanced data mining and outlier detection based on the IQR analysis performed on the discrete bins or groups; and 2) the subsequent recent time-series analysis. For example, based on the response (i.e., classification(s) 158) to request anomalies 152 command, user 112 can characterize the identified (classified) anomalies (function 164), and perform an action (function 166) which can affect and improve the operation and performance of a manufacturing system or other physical system associated with room 130 and devices 132.1-132.$m$ in room 130. The action can be a remedial or a corrective action to ensure that the classified anomaly no longer occurs. User 112 can also monitor, observe, and classify subsequent testing data to determine whether the actions of user 112 have the intended effect, including the removal or deletion of any previously detected anomalies.

Exemplary Anomaly Characterization Based on Joint Historical Analysis and Recent Time-Series Analysis (Potting Machine Power Vs. Count)

Figure 2A:
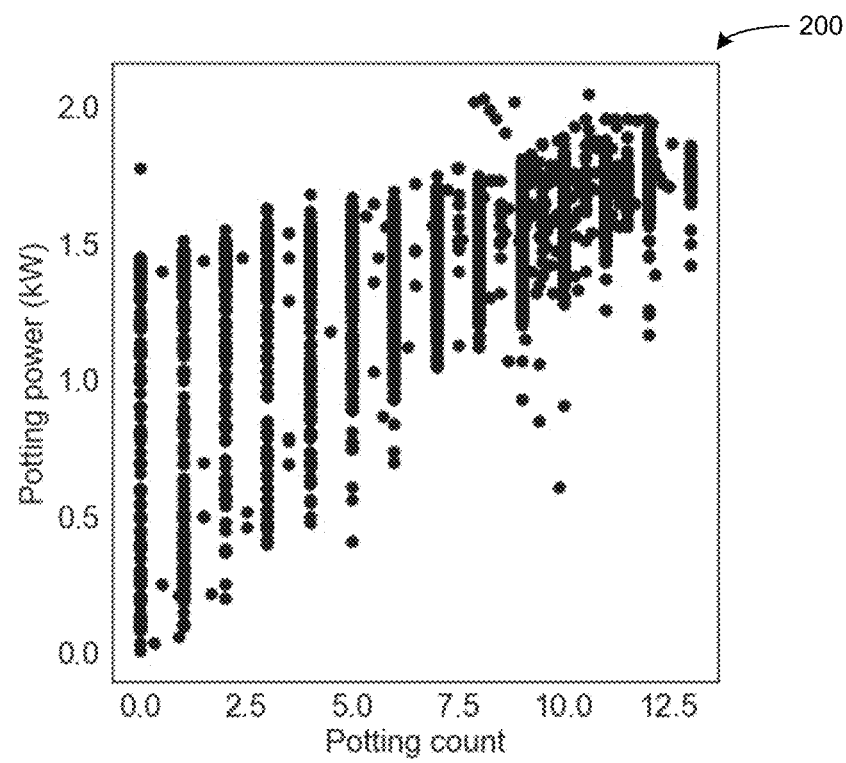
FIG. 2A illustrates a graph with exemplary testing data, including aggregated snapshots over a period of time for a two-dimensional data set, in accordance with an embodiment of the present invention.

FIG. 2A illustrates a graph 200 with exemplary testing data, including aggregated snapshots over a period of time for a two-dimensional data set, in accordance with an embodiment of the present invention. Graph 200 can include a data series (e.g., time-series data) for a potting machine. Graph 200 can include an x-axis which indicates a potting count (e.g., a number of items produced or potted), and a y-axis which indicates the sum of the power consumed by the potting machine (as measured via multiple sensors in kWh or kW). In graph 420, the blue color indicates the two-dimensional testing data (e.g., a "first set of testing data").

Figure 2B:
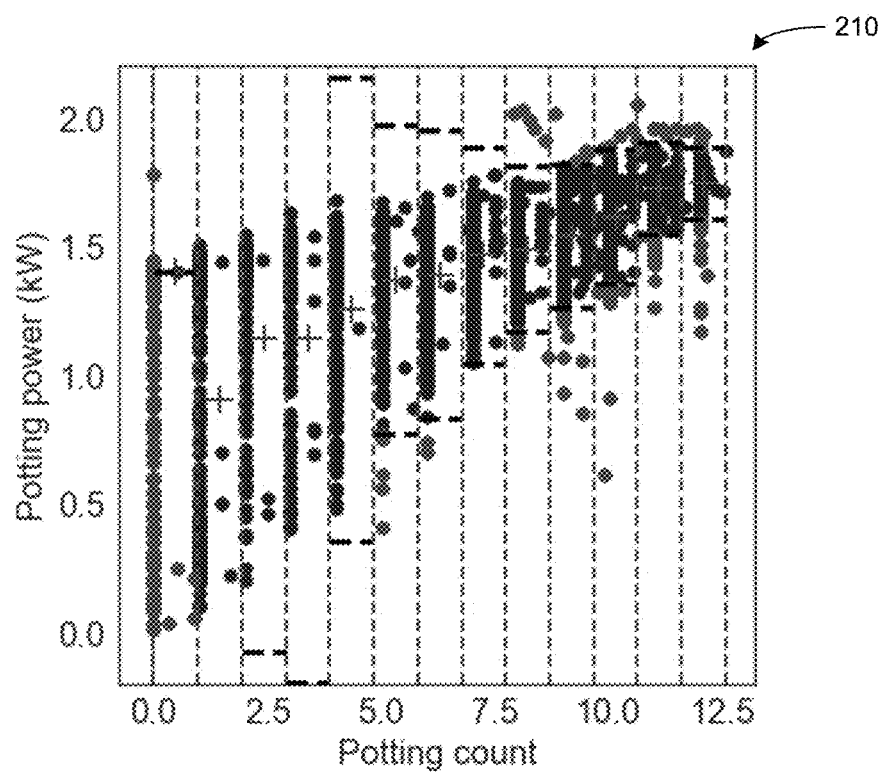
FIG. 2B illustrates a graph with the exemplary testing data of FIG. 2A, including performing an inter-quartile range analysis on the testing data which has been divided into bins or groups, in accordance with an embodiment of the present invention.

FIG. 2B illustrates a graph 210 with the exemplary testing data of FIG. 2A, including performing an inter-quartile range analysis on the testing data which has been divided into bins or groups, in accordance with an embodiment of the present invention. Graph 210 can include an x-axis which indicates a potting count (e.g., a number of items produced or potted), and a y-axis which indicates the sum of the power consumed by the potting machine (as measured via multiple sensors in kWh or kW). In graph 210, the vertical dashed red lines indicate separations between "bins" or groups. That is, the system determines a number n of bins, which can be based on, e.g., an automatic process, an algorithm, a resolution of a sensor or a machine involved in obtaining the data, or historical data or knowledge related to the data and obtained by a computing device or a user. The system can perform an IQR analysis on each bin. In each bin, the solid black lines indicate an upper bound and a lower bound, while the green "+" symbol indicates the median for the respective bin. The blue color in graph 210 indicates the two-dimensional data which is classified as normal or not classified as an anomaly based on the IQR analysis for the respective bin. The red color in graph 210 indicates the two-dimensional data which is classified as an anomaly or an outlier based on the IQR analysis for the respective bin.

However, the identified anomalies of graph 210 in FIG. 2B do not indicate the type of anomaly. That is, the system does not characterize the identified anomalies, e.g., as associated with a power surge or a sudden transient change in a control variable.

Figures 2C, 2D:
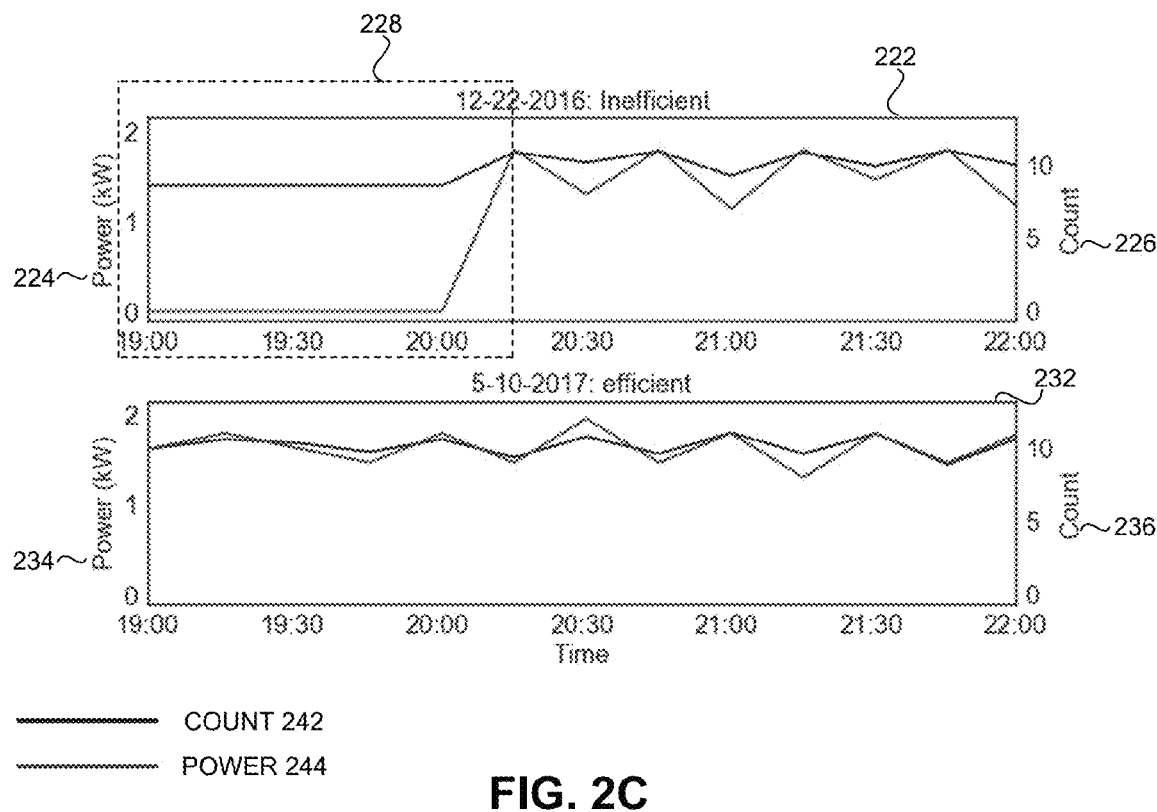
FIG. 2C illustrates a graph of data obtained from the exemplary testing data of FIG. 2A, including time-series data from a recent time period for each variable of the two-dimensional data set and a characterization of an anomaly as associated with a power surge, in accordance with an embodiment of the present invention.
FIG. 2D illustrates a table of results based on the exemplary testing data of FIG. 2A, including a characterization or a reason for a particular data point which may be classified as an anomaly, in accordance with an embodiment of the present invention.

FIG. 2C illustrates graphs 222 and 232 of data obtained from the exemplary testing data of FIG. 2A, including time-series data from a recent time period for each variable of the two-dimensional data set and a characterization of an anomaly as associated with a power surge, in accordance with an embodiment of the present invention. Graph 222 includes data for a three-hour period on 22 Dec. 2016 (e.g., a "second set of testing data"). A measure of a power 224 is in kW, and appears in a red color (as indicated by a power 244 in the index). A measure of a count 226 is in units of items produced, and appears in a blue color (as indicated by a count 242 in the index). Box 228 can indicate data corresponding to a classified anomaly from graph 210 of FIG. 2B. The user (or system) can perform this recent time-series analysis on the second set of data (in graph 222), and characterize the previously detected and classified anomaly based on whether a magnitude of a derivative of the second set of testing data is greater than a first predetermined threshold. For example, by observing that the change in the power with respect to the change in the count is above a certain threshold, the user (or system) can determine that this is an inefficient anomaly associated with a power surge at that particular time (e.g., around 20:00).

Similarly, graph 232 includes data for a three-hour period on 10 May 2017 (e.g., a "second set of testing data"). A measure of a power 234 is in kW, and appears in a red color (as indicated by the power 244 in the index). A measure of a count 236 is in units of items produced, and appears in a blue color (as indicated by the count 242 in the index).

FIG. 2D illustrates a table 250 of results based on the exemplary testing data of FIG. 2A, including a characterization or a reason for a particular data point which may be classified as an anomaly, in accordance with an embodiment of the present invention. Table 250 can include, but is not limited to, columns such as: an index 252; a time 254; a place 256; a machine 258; a reason 260; and an amount 262. In the conventional system, reason 260 can only be characterized as "normal" or "not normal" (or "not anomalous" or "anomalous"). In contrast, in the embodiments described herein, reason 260 can include a more specific characterization of the anomaly. For example, entries 264 and 266 indicate that the reason for the positive kWh amount is "over usage" rather than "under usage." Thus, reason 260 can provide more information to the user, and allow the user to perform actions to remediate or correct such an anomaly.

Figure 2E:
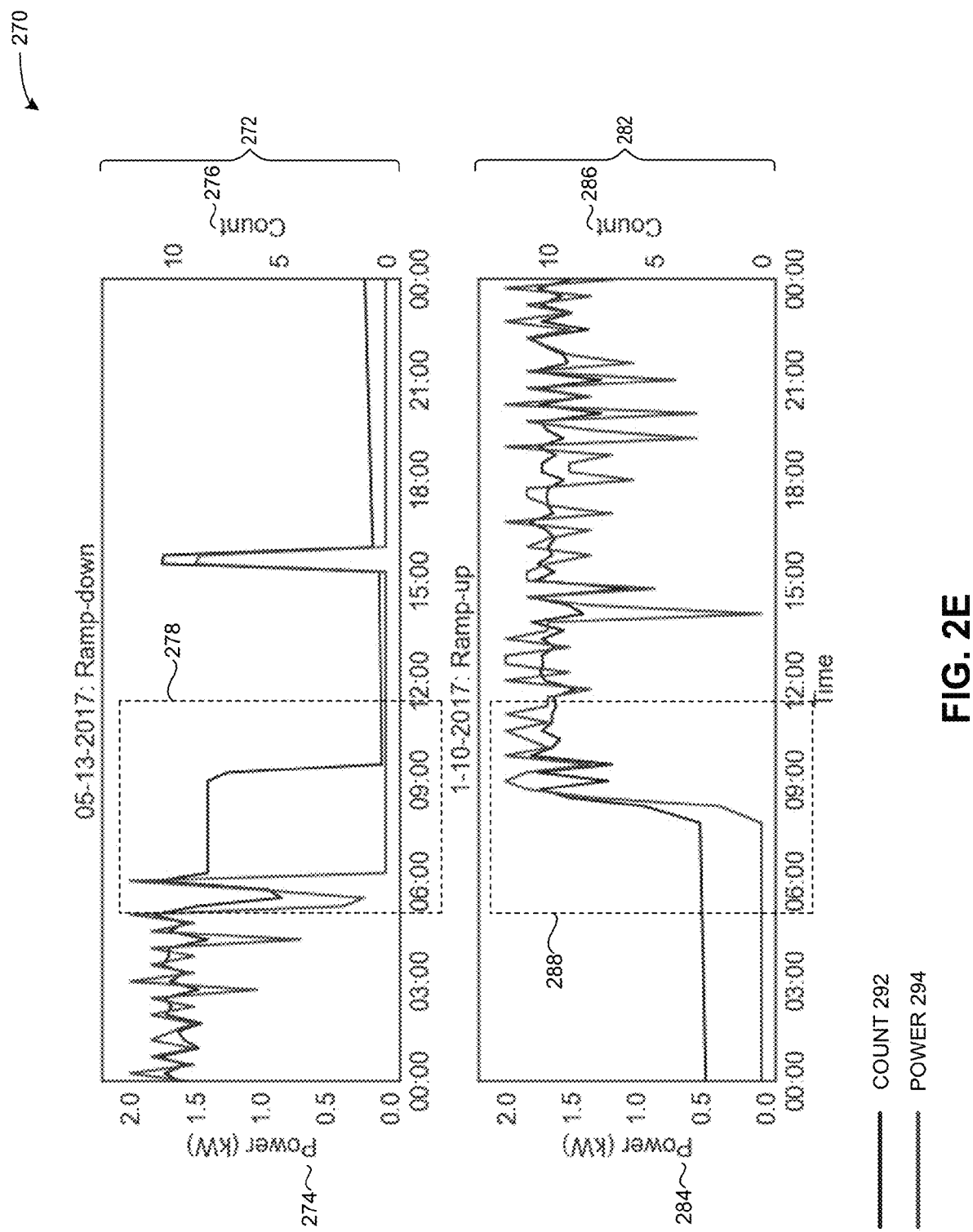
FIG. 2E presents an exemplary recent time-series analysis, including a characterization of an anomaly as associated with a power surge, in accordance with an embodiment of the present invention.

FIG. 2E illustrates graphs 272 and 282 of data obtained from the exemplary testing data of FIG. 2A, including time-series data from a recent time period for each variable of the two-dimensional data set and a characterization of an anomaly as associated with a power surge, in accordance with an embodiment of the present invention. Graph 272 includes data for a 24-hour period on 13 May 2017 (e.g., a "second set of testing data"). A measure of a power 274 is in kW, and appears in a red color (as indicated by a power 294 in the index). A measure of a count 276 is in units of items produced, and appears in a blue color (as indicated by a count 292 in the index). Box 278 can indicate data corresponding to a classified anomaly from graph 210 of FIG. 2B. The user (or system) can perform this recent time-series analysis on the second set of data (in graph 272), and characterize the previously detected and classified anomaly based on whether a magnitude of a derivative of the second set of testing data is greater than a first predetermined threshold. For example, by observing that the change in the power with respect to the change in the count is above a certain threshold, the user (or system) can determine that this is an anomaly associated with a ramp-down in power at that particular time (e.g., around 06:00).

Similarly, graph 282 includes data for a 24-hour period on 10 Jan. 2017 (e.g., "second set of testing data"). A measure of a power 284 is in kW, and appears in a red color (as indicated by the power 294 in the index). A measure of a count 286 is in units of items produced, and appears in a blue color (as indicated by the count 292 in the index). Box 288 can indicate data corresponding to a classified anomaly from graph 210 of FIG. 2B. The user (or system) can perform this recent time-series analysis on the second set of data (in graph 282), and characterize the previously detected and classified anomaly based on whether a magnitude of a derivative of the second set of testing data is greater than a first predetermined threshold. For example, by observing that the change in the power with respect to the change in the count is above a certain threshold, the user (or system) can determine that this is an anomaly associated with a ramp-up in power at that particular time (e.g., around 06:00).

The user (or system) can subsequently use this data to classify a certain data point as a certain type of anomaly, and can subsequently perform an action to address the classified and characterized anomaly. For example, because both anomalies were characterized as associated with a ramp-down or a ramp-up process, occurring around the same time of day, the user can obtain the appropriate data for a similar time period for other days, particularly for days which are classified as an anomaly in a previous binned IQR analysis (as in FIGS. 2B and 4B). If the data around the 06:00 hour indicates a similar ramp-up or ramp-down (due to a power surge), the user may conclude that some server process or other operation relating to the physical devices in the relevant room may be causing these power-surge related anomalies. The user may then take a perform a remedial or a corrective action to ensure that the classified (and characterized) anomaly no longer occurs. The user can adjust a physical parameter which affects a variable being measured (e.g., the compressor flow or the compressor energy), and can also adjust a physical component of a device from which the data series is obtained (e.g., the compressor or a sensor on the compressor which measures and thus provides the data for the data series). Alternatively, upon characterizing these anomalies as related to power surges, the user may determine that no action need to be taken, e.g., if the power surges occur at expected times or intervals, such as during a planned power cycling or a system reboot.

Figure 3A:
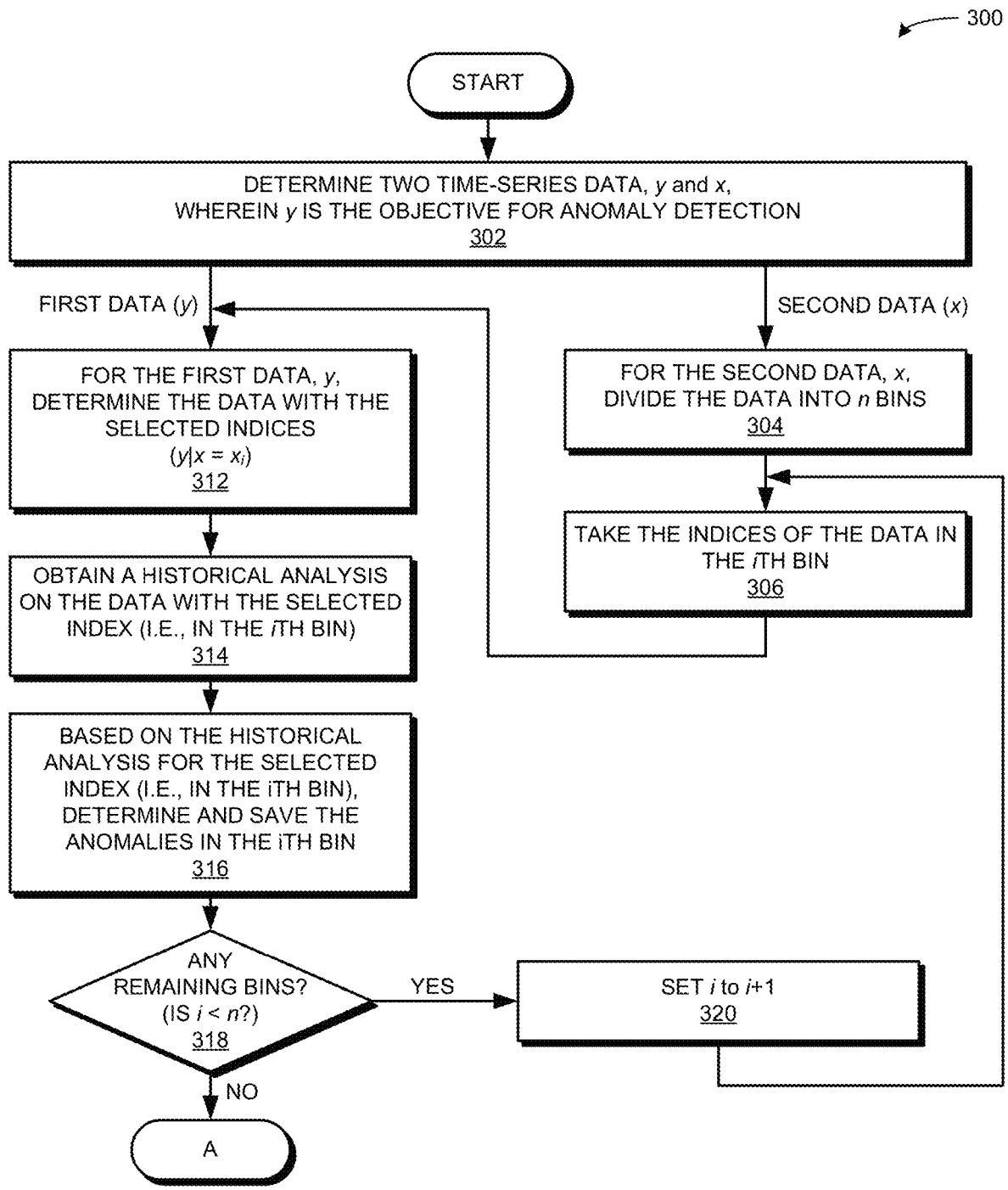
FIG. 3A presents a flow chart illustrating a method for facilitating anomaly detection and characterization, in accordance with an embodiment of the present invention.

Method for Facilitating Anomaly Detection Based on Joint Historical Analysis and Recent Time-Series Analysis FIG. 3A presents a flow chart 300 illustrating a method for facilitating anomaly detection and characterization, in accordance with an embodiment of the present invention. During operation, the system determines a data series for a first variable and one or more second variables, y and x, wherein y is the objective for anomaly detection (operation 302). It is known that the second data x affects the behavior of the first data y. For the second data x, the system divides the data into n bins (operation 304). The system takes the indices of the data in the ith bin (operation 306), and passes that into the next operation. For the first data y, the system determines the data with the selected indices ($y|x=x_1$) (operation 312). The system obtains a historical analysis on the data with the selected index (i.e., performs an IQR analysis on the data in the ith bin) (operation 314). Based on the historical analysis for the selected index (i.e., for the data in the ith bin), the system determines the anomalies in the ith bin (operation 316). The system also saves the determined anomalies.

If there are no remaining bins (i.e., the current index i is not less than the number of bins n) (decision 318), the operation continues as described below at Label A of FIG. 3B. If there are remaining bins (i.e., the current index i is less than the number of bins n) (decision 318), the system increments i (by setting i to i+1), and the operation returns to operation 306.

Figure 3B:
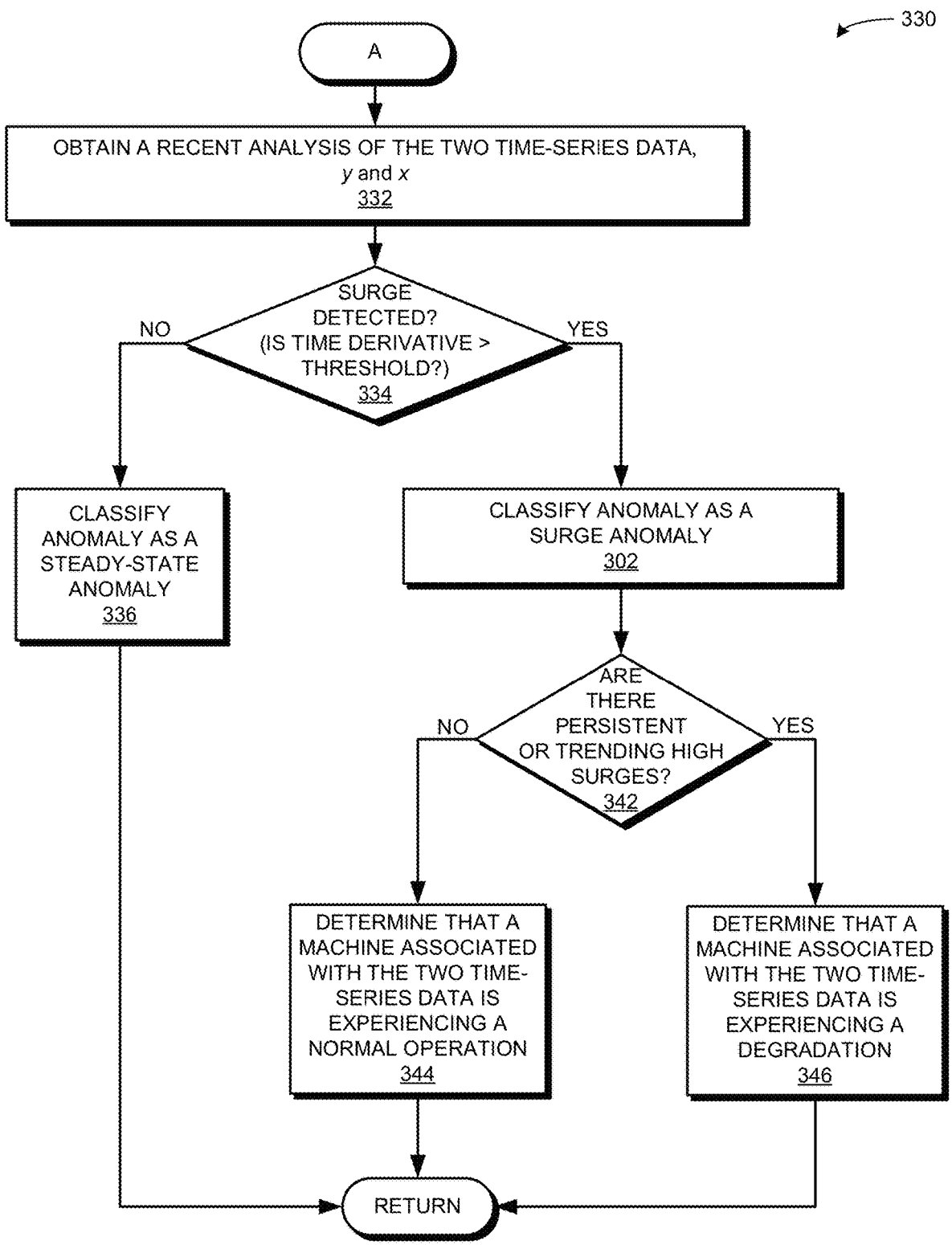
FIG. 3B presents a flow chart illustrating a method for facilitating anomaly detection and characterization, in accordance with an embodiment of the present invention.

FIG. 3B presents a flow chart 330 illustrating a method for facilitating anomaly detection and characterization, in accordance with an embodiment of the present invention. The system obtains a recent time-series analysis of the data series for the first variable and the one or more second variables, y and x. If the system does not detect a surge (i.e., if a magnitude of a time derivative is not greater than a first predetermined threshold) (decision 334), the system classifies the anomaly as a steady-state anomaly (operation 336).

If the system does detect a surge (i.e., if the time derivative is greater than a first predetermined threshold) (decision 334), the system classifies the anomaly as a surge anomaly (operation 336). If the system does not detect persistent or trending high surges (decision 342), the system determines that a machine associated with the data series is experiencing a normal operation (operation 344). If the system does detect persistent or trending high surges (decision 342), the system determines that a machine associated with the data series is experiencing a degradation (operation 346). The system can determine whether it detects persistent or trending high surges based on a physical device involved in obtaining the data series, where the trend is greater than a second predetermined threshold.

Exemplary Anomaly Characterization Based on Joint Historical Analysis and Recent Time-Series Analysis (Compressor Flow Vs. Energy)

Figure 4A:
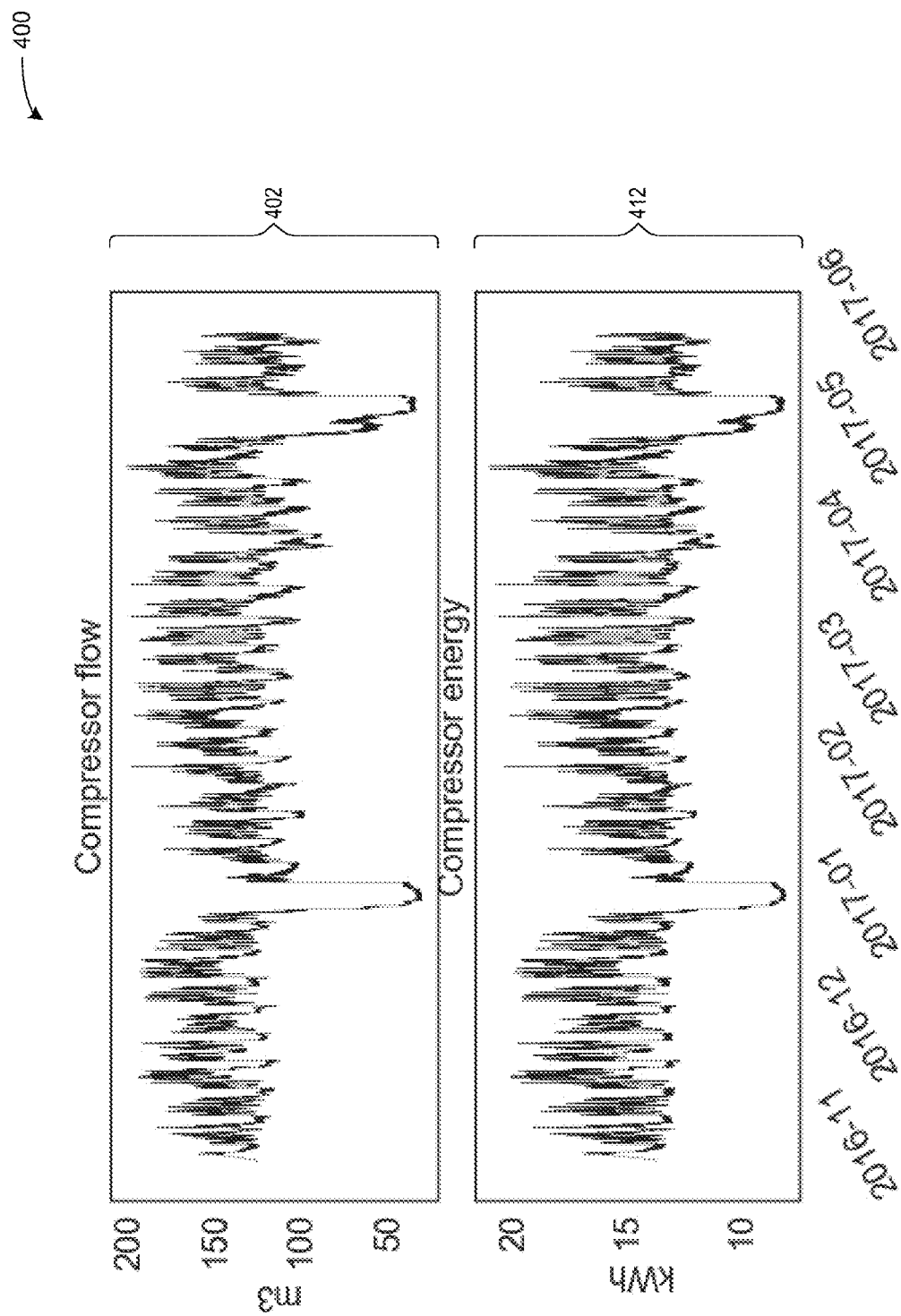
FIG. 4A presents an exemplary historical time-series analysis for two-dimensional data, in accordance with an embodiment of the present invention.

FIG. 4A presents an exemplary historical time-series analysis 400 for two-dimensional data, in accordance with an embodiment of the present invention. Analysis 400 includes a graph 402 and a graph 412. Graph 402 can include an x-axis which indicates time (e.g., marked by one-month intervals), and a y-axis which indicates a measure of the flow of the compressor (in $m^3$). Graph 412 can include an x-axis which indicates time (e.g., marked by one-month intervals), and a y-axis which indicates a measure of the sum of the energy consumed by the compressor (in kWh). The blue color in graphs 402 and 412 indicates the historical time-series data for each dimension (e.g., a "first set of testing data").

Figure 4B:
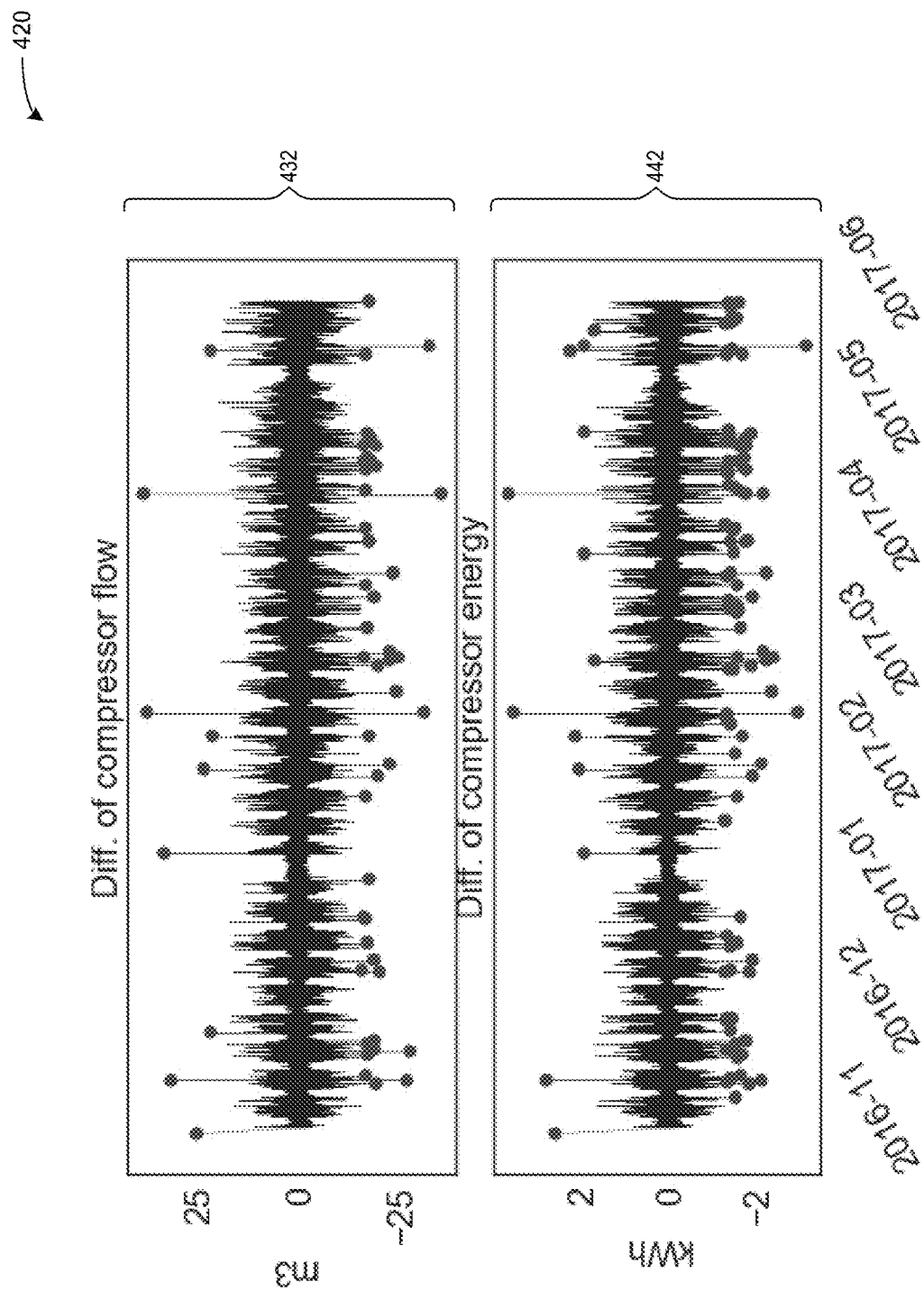
FIG. 4B presents an exemplary historical time-series analysis for the derivative of the two-dimensional data of FIG. 4A, in accordance with an embodiment of the present invention.

FIG. 4B presents an exemplary historical time-series analysis 420 for the derivative of the two-dimensional data of FIG. 4A, in accordance with an embodiment of the present invention. Analysis 420 includes a graph 432 and a graph 442. Graph 432 indicates the derivative of the time-series data in graph 402 of FIG. 4A (i.e., of the compressor flow over time). Graph 442 indicates the derivative of the time-series data in graph 412 of FIG. 4A (i.e., of the compressor energy over time). The blue color in graphs 432 and 442 indicates the derivative of the time-series data for each dimension, while the red color indicates the peaks in the derivative. The system can check the peaks by performing an IQR analysis based on the data in graphs 432 and 442.

Figure 4C:
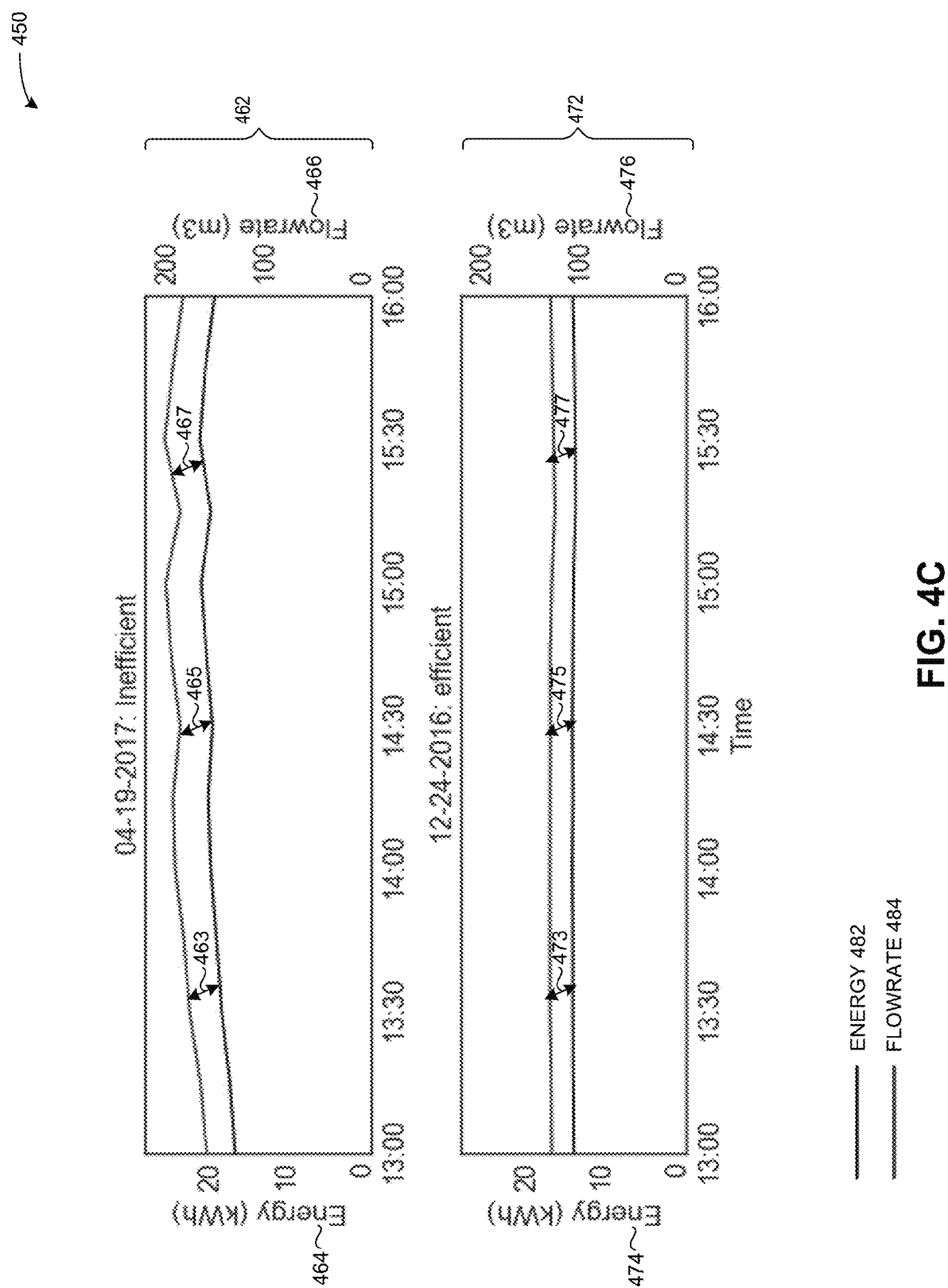
FIG. 4C presents an exemplary recent time-series analysis for the data obtained from the exemplary data of FIG. 4B, including a characterization of an anomaly, in accordance with an embodiment of the present invention.

FIG. 4C presents an exemplary recent time-series analysis 450 for the data obtained from the exemplary data of FIG. 4B, including a characterization of an anomaly, in accordance with an embodiment of the present invention. Analysis 450 includes a graph 462 and a graph 472. Graph 462 indicates data from each of the two dimensions of data of FIGS. 4A and 4B. Specifically, graph 462 includes data for a three-hour period on 19 Apr. 2017 (e.g., a "second set of testing data"). A measure of a flowrate 466 is in $m^3$, and appears in a red color (as indicated by a flowrate 484 in the index). A measure of an energy 464 is in kWh, and appears in a blue color (as indicated by an energy 482 in the index). Similarly, graph 472 includes data for a three-hour period on 24 Dec. 2016 (e.g., a "second set of testing data"). A measure of a flowrate 476 is in $m^3$, and appears in a red color (as indicated by the flowrate 484 in the index). A measure of an energy 474 is in kWh, and appears in a blue color (as indicated by the energy 482 in the index).

After checking the peaks of the exemplary data in graphs 432 and 442, the system can identify and further characterize anomalies as associated with a power up/down surge using the time-series data, including, e.g., time-series analyses which show both "efficient" usage (as in graph 472) and "inefficient" usage (as in graph 462). The surges may be identified by looking at the identified anomalies (e.g., at points 463, 465, and 467) as compared to the historical or expected usage (e.g., at points 473, 475, and 477). Note that analysis 450 depicts data which is characterized as "efficient" or "inefficient" for the same three-hour window during different days, but can also include data over a different window, period, or interval of time.

Figure 5:
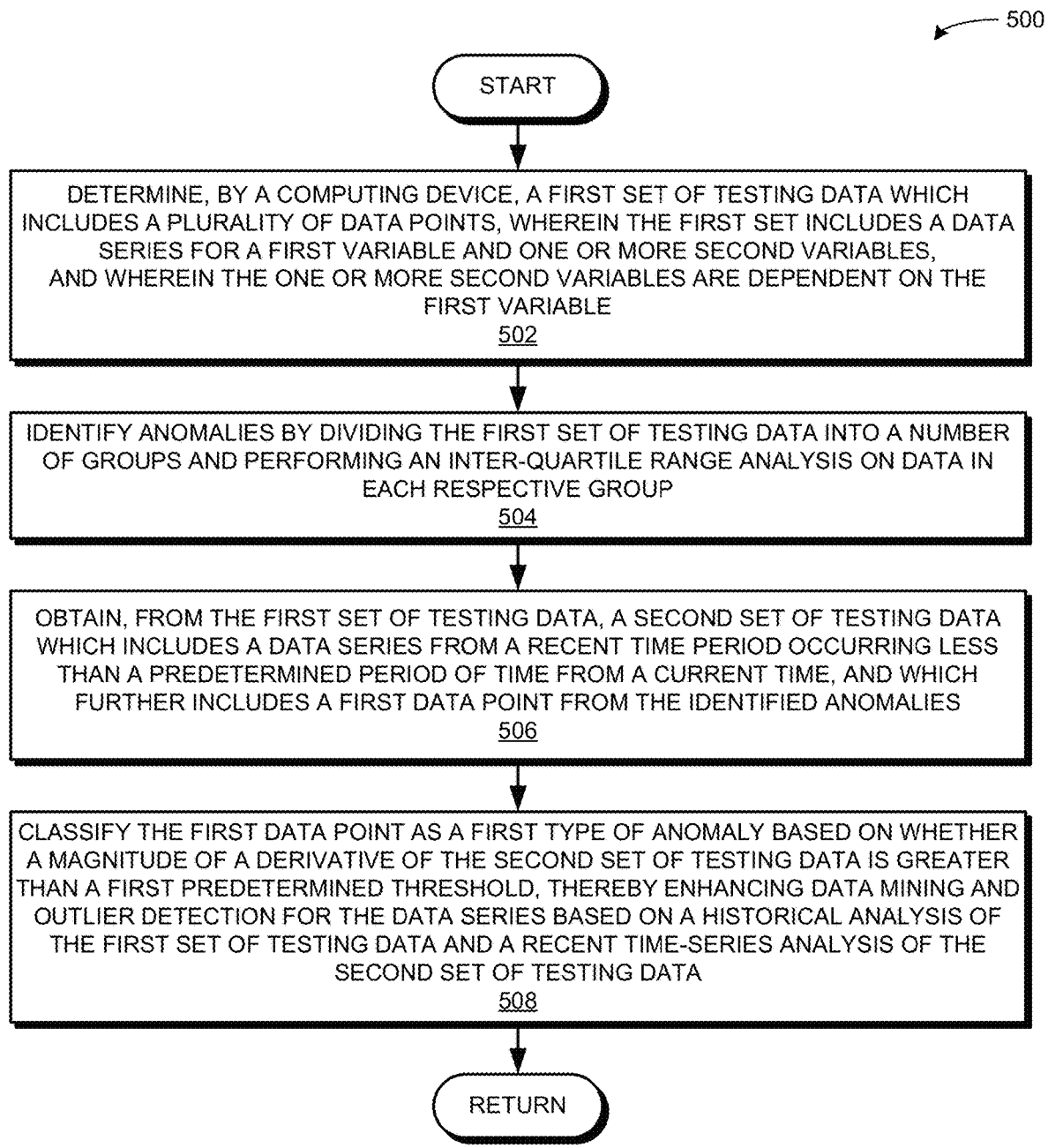
FIG. 5 presents a flow chart illustrating a method for facilitating anomaly detection and characterization, in accordance with an embodiment of the present invention.

Method for Facilitating Anomaly Detection Based on Joint Historical Analysis and Recent Time-Series Analysis FIG. 5 presents a flow chart 500 illustrating a method for facilitating anomaly detection and characterization, in accordance with an embodiment of the present invention. During operation, the system determines, by a computing device, a first set of testing data which includes a plurality of data points, wherein the first set includes a data series for a first variable and one or more second variables, and wherein the one or more second variables are dependent on the first variable (operation 502). The system identifies anomalies by dividing the first set of data into a number of groups and performing an inter-quartile range analysis on data in each respective group (operation 504). The system obtains, from the first set of testing data, a second set of testing data which includes a data series from a recent time period occurring less than a predetermined period of time from a current time, and which further includes a first data point from the identified anomalies (operation 506). The system classifies the first data point as a first type of anomaly based on whether a magnitude of a derivative of the second set of testing data is greater than a first predetermined threshold, thereby enhancing data mining and outlier detection for the data series based on a historical analysis of the first set of testing data and a recent time-series analysis of the second set of testing data (operation 508).

Exemplary Computer and Communication System and Exemplary Apparatus

Figure 6:
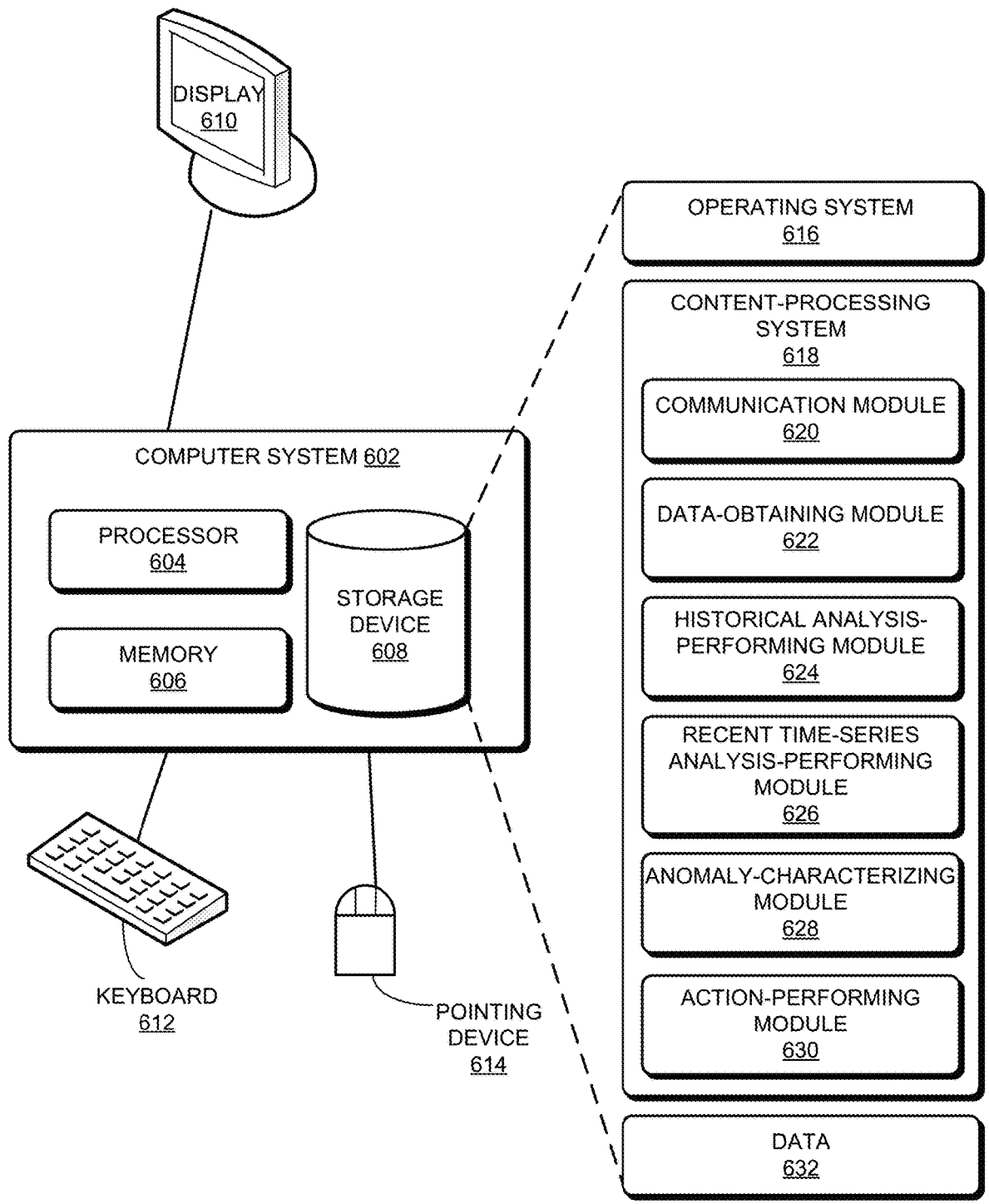
FIG. 6 illustrates an exemplary distributed computer and communication system that facilitates anomaly detection and characterization, in accordance with an embodiment of the present invention.

FIG. 6 illustrates an exemplary distributed computer and communication system that facilitates anomaly detection and characterization, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 616, and a pointing device 616. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network (communication module 620). A data packet can include data, time-series data, a data series, a classification, a request, a command, a testing instance, and a training instance.

Content-processing system 618 can include instructions for determining, by a computing device, a first set of testing data which includes a plurality of data points, wherein the first set includes a data series for a first variable and one or more second variables, and wherein the one or more second variables are dependent on the first variable (communication module 620 and data-obtaining module 622). Content-processing system 618 can include instructions for identifying anomalies by dividing the first set of testing data into a number of groups and performing an inter-quartile range analysis on data in each respective group (historical analysis-performing module 624). Content-processing system 618 can also include instructions for obtaining, from the first set of testing data, a second set of testing data which includes a data series from a recent time period occurring less than a predetermined period of time before a current time, and which further includes a first data point from the identified anomalies (recent time-series analysis-performing module 626). Content-processing system 618 can include instructions for classifying the first data point as a first type of anomaly based on whether a magnitude of a derivative of the second set of testing data is greater than a first predetermined threshold, thereby enhancing data mining and outlier detection for the data series based on a historical analysis of the first set of testing data and a recent time-series analysis of the second set of testing data (anomaly-characterizing module 628).

Content-processing system 618 can additionally include instructions for classifying, by a user of the computing device, the first data point as the first type of anomaly based on a set of predetermined conditions (anomaly-characterizing module 628). Content-processing system 618 can include instructions for performing, by the user of the computing device, an action to address the classified anomaly (action-performing module 630).

Data 632 can include any data that is required as input or that is generated as output by the methods and/or processes described in this disclosure. Specifically, data 632 can store at least: data; a set of testing data; a plurality of data points; a first variable; one or more second variables; time-series data for a first and the one or more second variables; a number of groups; a type of the time-series data; an inter-quartile range; a classification for a testing data point; a testing data point which is classified as an anomaly; a testing data point which is classified as a normal data point; an indicator of an enhanced data mining and outlier detection for time-series data for multiple variables; an indicator of an action; a remedial or corrective action; an anomaly; a classified anomaly; a characterization of an anomaly; a predetermined threshold; a magnitude of a derivative or a derivative of a data point or a set of data; an indicator of a physical parameter which affects the first variable or the second variables; a temperature value; a count, quantity or other unit to measure production; a unit or measurement of flow for a material; a unit or measurement of pressure for a material; a control parameter; any parameter which can be used as a control parameter in measuring another parameter; an indicator of a sensor, a smart meter, an IoT device, and any device which can measure a parameter; a type of an anomaly; a surge in a control parameter; an on/off event; a sudden transient change in a control parameter; a steady-state anomaly; a trend; an indicator of high surges; an indicator that a physical device is experiencing a normal operation; an indicator that a physical device is experiencing a degradation; and an indicator of a physical component of a device from which the data series is obtained.

Figure 7:
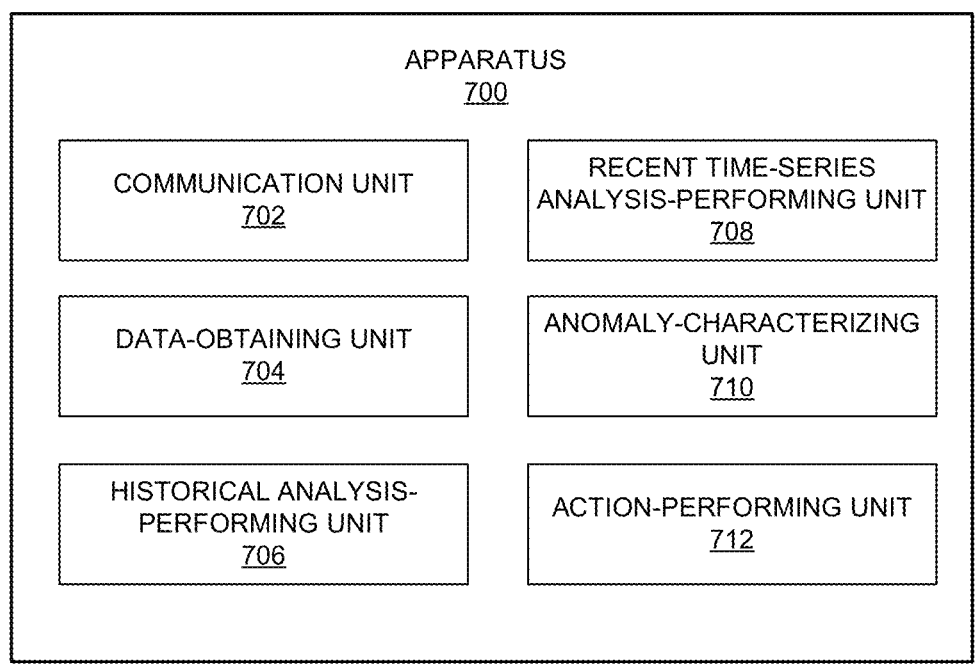
FIG. 7 illustrates an exemplary apparatus that facilitates anomaly detection and characterization, in accordance with an embodiment of the present invention.

FIG. 7 illustrates an exemplary apparatus that facilitates anomaly detection and characterization, in accordance with an embodiment of the present invention. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device which is capable of communicating with other computer systems and/or devices. Specifically, apparatus 700 can comprise units 700-712 which perform functions or operations similar to modules 620-630 of computer system 602 of FIG. 6, including: a communication unit 702; a data-obtaining unit 704; a historical analysis-performing unit 706; a recent time-series analysis-performing unit 708; an anomaly-characterizing unit 710; and an action-performing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating anomaly detection and characterization, the method comprising:
    determining, by a computing device, a first set of testing data which includes a plurality of data points, wherein the first set includes a data series for a first variable and one or more second variables, and wherein the one or more second variables are dependent on the first variable;
    identifying anomalies by dividing the first set of testing data into a number of groups and performing an interquartile range analysis on data in each respective group;
    obtaining, from the first set of testing data, a second set of testing data which includes a data series from a recent time period occurring less than a predetermined period of time before a current time, and which further includes a first data point from the identified anomalies; and
    responsive to determining that a magnitude of a derivative of the second set of testing data is greater than a first predetermined threshold, classifying the first data point as a first type of anomaly associated with one or more of: a surge in a control parameter; an on/off event; and a sudden transient change in the control parameter,
    thereby enhancing data mining and outlier detection for the data series based on a historical analysis of the first set of testing data and a recent time-series analysis of the second set of testing data.

2. The method of claim 1, wherein the first variable or the one or more second variables is one or more of:
    a parameter associated with a physical device involved in obtaining the first set of testing data,
    wherein the parameter is one or more of:
        a temperature value;
        a count, quantity, or other unit to measure production;
        a unit or measurement of flow for a material;
        a unit or measurement of pressure for a material; and
        any parameter which can be used as a control parameter in measuring another parameter.

3. The method of claim 2, wherein the physical device is one or more of a sensor, a smart meter, an Internet of Things (IoT) device, and any device which can measure the parameter.

4. The method of claim 1, further comprising:
    responsive to determining that the magnitude of the derivative of the second set of testing data is not greater than the first predetermined threshold classifying the first data point as a second type of anomaly.

5. The method of claim 4,
    wherein the second type of anomaly is associated with a steady-state anomaly.

6. The method of claim 1, further comprising:
    detecting a trend which indicates high surges associated with a physical device involved in obtaining the first set of testing data, by determining a third set of data points which are classified as anomalies and are attributable to the surge in the control parameter, the on/off event, or the sudden transient change in the control parameter.

7. The method of claim 6, further comprising:
    in response to determining that the trend is not greater than a second predetermined threshold, determining that the physical device is experiencing normal operation; and
    in response to determining that the trend is greater than the second predetermined threshold, determining that the physical device is experiencing degradation.

8. The method of claim 1, further comprising:
    classifying, by a user of the computing device, the first data point as the first type of anomaly based on a set of predetermined conditions;
    performing, by the user of the computing device, an action to address the classified anomaly,
    wherein the action includes one or more of:
        a remedial or corrective action to ensure that the classified anomaly no longer occurs;
        adjusting a physical parameter which affects the first variable or the one or more second variables; and
        adjusting a physical component of a device from which the data series is obtained.

9. A computer system for facilitating anomaly detection and characterization, the computer system comprising:
    a processor; and
    a storage device storing instructions that when executed by the processor cause the processor to perform a method, the method comprising:
        determining, by a computing device, a first set of testing data which includes a plurality of data points, wherein the first set includes a data series for a first variable and one or more second variables, and wherein the one or more second variables are dependent on the first variable;
        identifying anomalies by dividing the first set of testing data into a number of groups and performing an interquartile range analysis on data in each respective group;

obtaining, from the first set of testing data, a second set of testing data which includes a data series from a recent time period occurring less than a predetermined period of time before a current time, and which further includes a first data point from the identified anomalies; and responsive to determining that a magnitude of a derivative of the second set of testing data is greater than a first predetermined threshold, classifying the first data point as a first type of anomaly associated with one or more of: a surge in a control parameter; an on/off event; and a sudden transient change in the control parameter, thereby enhancing data mining and outlier detection for the data series based on a historical analysis of the first set of testing data and a recent time-series analysis of the second set of testing data.

10. The computer system of claim 9, wherein the first variable or the one or more second variables is one or more of:
  a parameter associated with a physical device involved in obtaining the first set of testing data,
    wherein the parameter is one or more of:
      a temperature value;
      a count, quantity, or other unit to measure production;
      a unit or measurement of flow for a material;
      a unit or measurement of pressure for a material; and
      any parameter which can be used as a control parameter in measuring another parameter.

11. The computer system of claim 10, wherein the physical device is one or more of a sensor, a smart meter, an Internet of Things (IoT) device, and any device which can measure the parameter.

12. The computer system of claim 9, wherein the method further comprises:
  responsive to determining that the magnitude of the derivative of the second set of testing data is not greater than the first predetermined threshold, classifying the first data point as a second type of anomaly.

13. The computer system of claim 12,
  wherein the second type of anomaly is associated with a steady-state anomaly.

14. The computer system of claim 9, wherein the method further comprises:
  detecting a trend which indicates high surges associated with a physical device involved in obtaining the first set of testing data, by determining a third set of data points which are classified as anomalies and are attributable to the surge in the control parameter, the on/off event, or the sudden transient change in the control parameter.

15. The computer system of claim 14, wherein the method further comprises:
  in response to determining that the trend is not greater than a second predetermined threshold, determining that the physical device is experiencing normal operation; and
  in response to determining that the trend is greater than the second predetermined threshold, determining that the physical device is experiencing degradation.

16. The computer system of claim 9, wherein the method further comprises:
  classifying, by a user of the computing device, the first data point as the first type of anomaly based on a set of predetermined conditions;
  performing, by the user of the computing device, an action to address the classified anomaly,
    wherein the action includes one or more of:
      a remedial or corrective action to ensure that the classified anomaly no longer occurs;
      adjusting a physical parameter which affects the first variable or the one or more second variables; and
      adjusting a physical component of a device from which the data series is obtained.

17. A non-transitory computer-readable storage medium storing instructions that when executed by a computer cause the computer to perform a method, the method comprising:
  determining, by a computing device, a first set of testing data which includes a plurality of data points, wherein the first set includes a data series for a first variable and one or more second variables, and wherein the one or more second variables are dependent on the first variable;
  identifying anomalies by dividing the first set of testing data into a number of groups and performing an interquartile range analysis on data in each respective group;
  obtaining, from the first set of testing data, a second set of testing data which includes a data series from a recent time period occurring less than a predetermined period of time before a current time, and which further includes a first data point from the identified anomalies; and
  responsive to determining that a derivative of the second set of testing data is greater than a first predetermined threshold, classifying the first data point as a first type of anomaly associated with one or more of: a surge in a control parameter; an on/off event; and a sudden transient change in the control parameter,
  thereby enhancing data mining and outlier detection for the data series based on a historical analysis of the first set of testing data and a recent time-series analysis of the second set of testing data.

18. The storage medium of claim 17, wherein the method further comprises:
  responsive to determining that the magnitude of the derivative of the second set of testing data is not greater than the first predetermined threshold classifying the first data point as a second type of anomaly.

19. The storage medium of claim 18,
  wherein the second type of anomaly is associated with a steady-state anomaly.

20. The storage medium of claim 17, wherein the method further comprises:
  detecting a trend which indicates high surges associated with a physical device involved in obtaining the first set of testing data, by determining a third set of data points which are classified as anomalies and are attributable to the surge in the control parameter, the on/off event, or the sudden transient change in the control parameter;
  in response to determining that the trend is not greater than a second predetermined threshold, determining that the physical device is experiencing normal operation; and
  in response to determining that the trend is greater than the second predetermined threshold, determining that the physical device is experiencing degradation.

* * * * *